Dec. 7, 1943. H. N. DURHAM ET AL 2,336,076
RECORDING MECHANISM FOR VEHICLE OPERATION
Filed Jan. 29, 1940 4 Sheets-Sheet 1
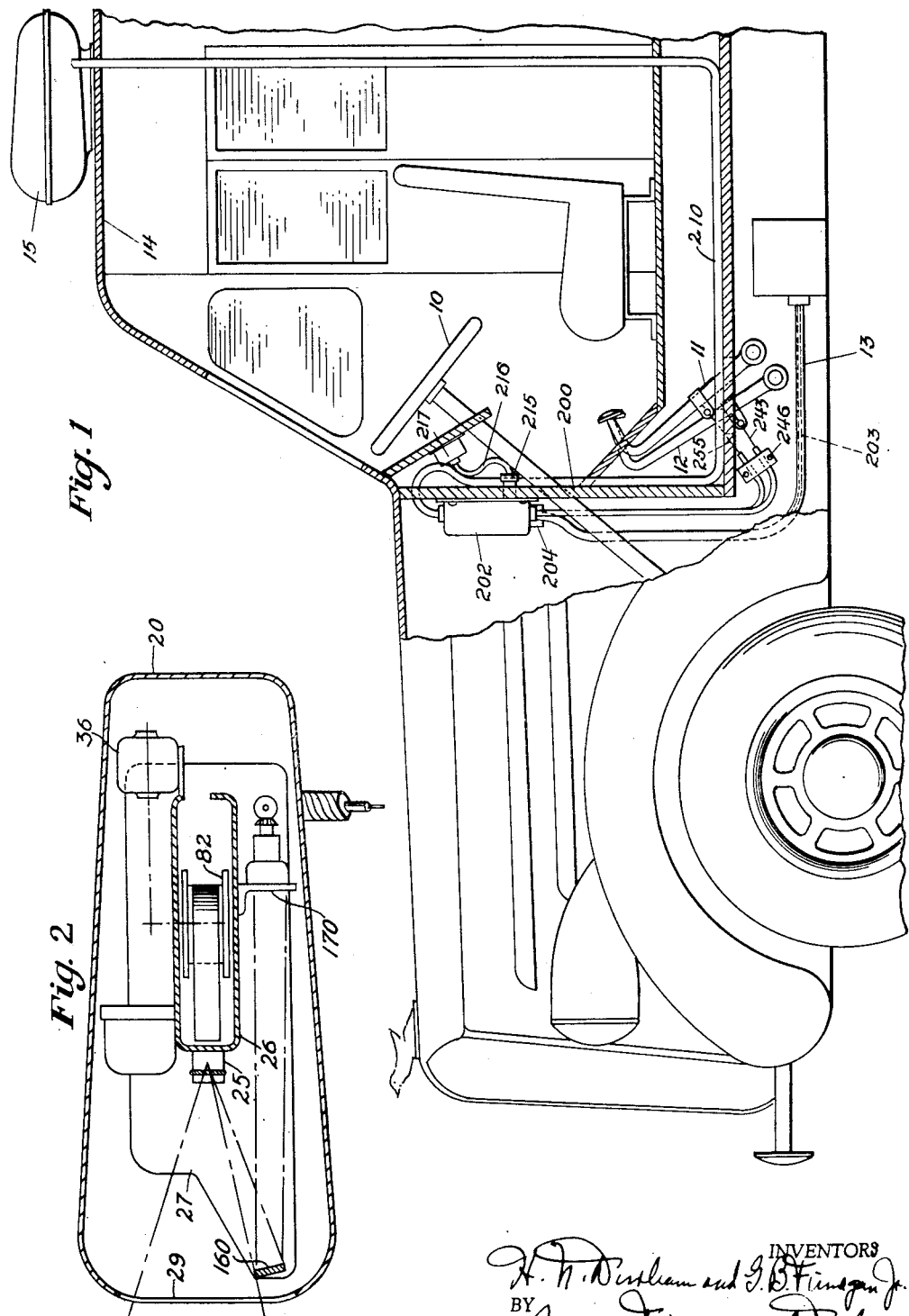

Dec. 7, 1943.   H. N. DURHAM ET AL   2,336,076
RECORDING MECHANISM FOR VEHICLE OPERATION
Filed Jan. 29, 1940   4 Sheets-Sheet 2
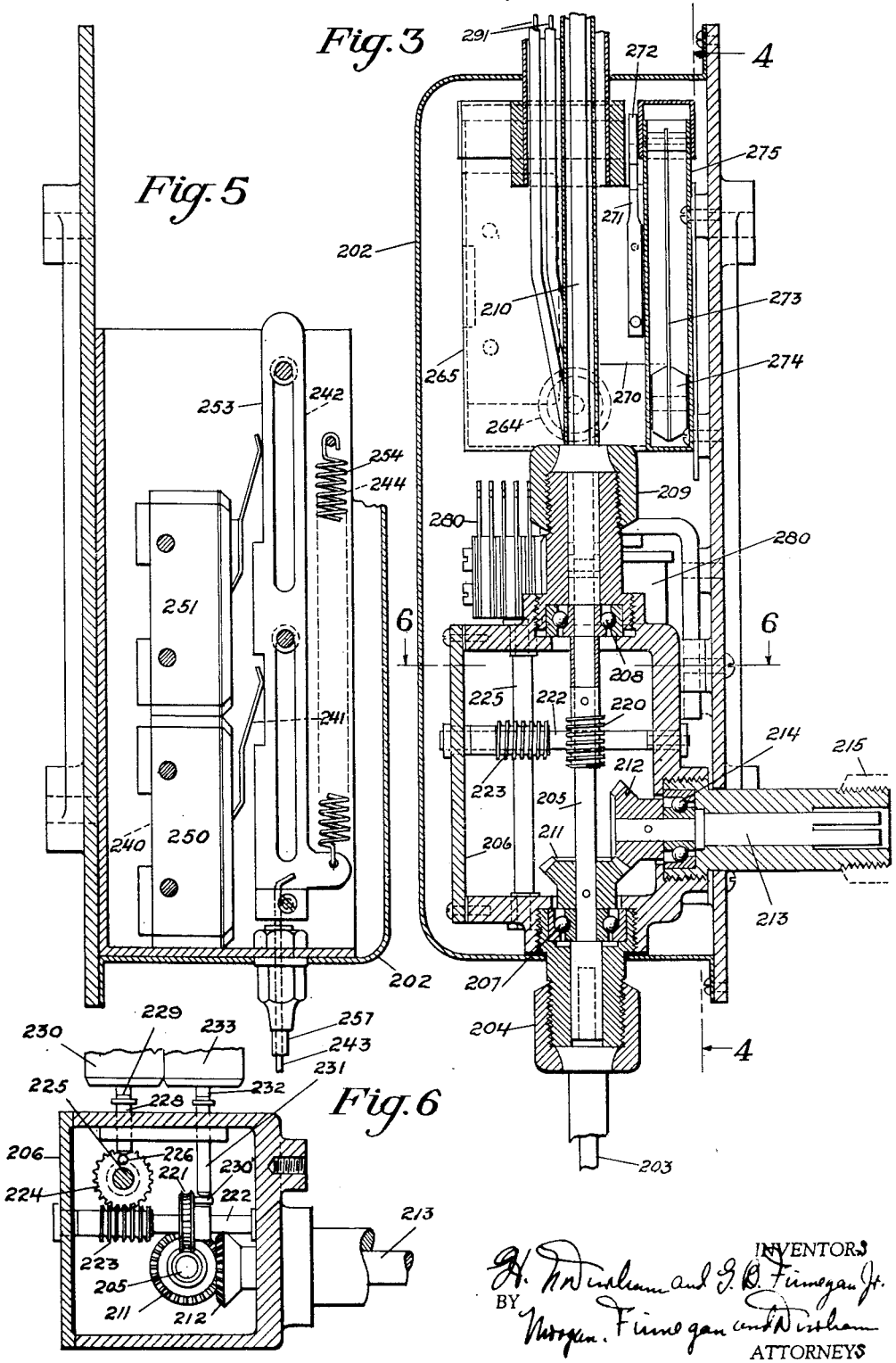
INVENTORS
H. N. Durham and J. B. Finnegan Jr.
BY
Morgan, Finnegan and Durham
ATTORNEYS Dec. 7, 1943.   H. N. DURHAM ET AL   2,336,076
RECORDING MECHANISM FOR VEHICLE OPERATION
Filed Jan. 29, 1940   4 Sheets-Sheet 4
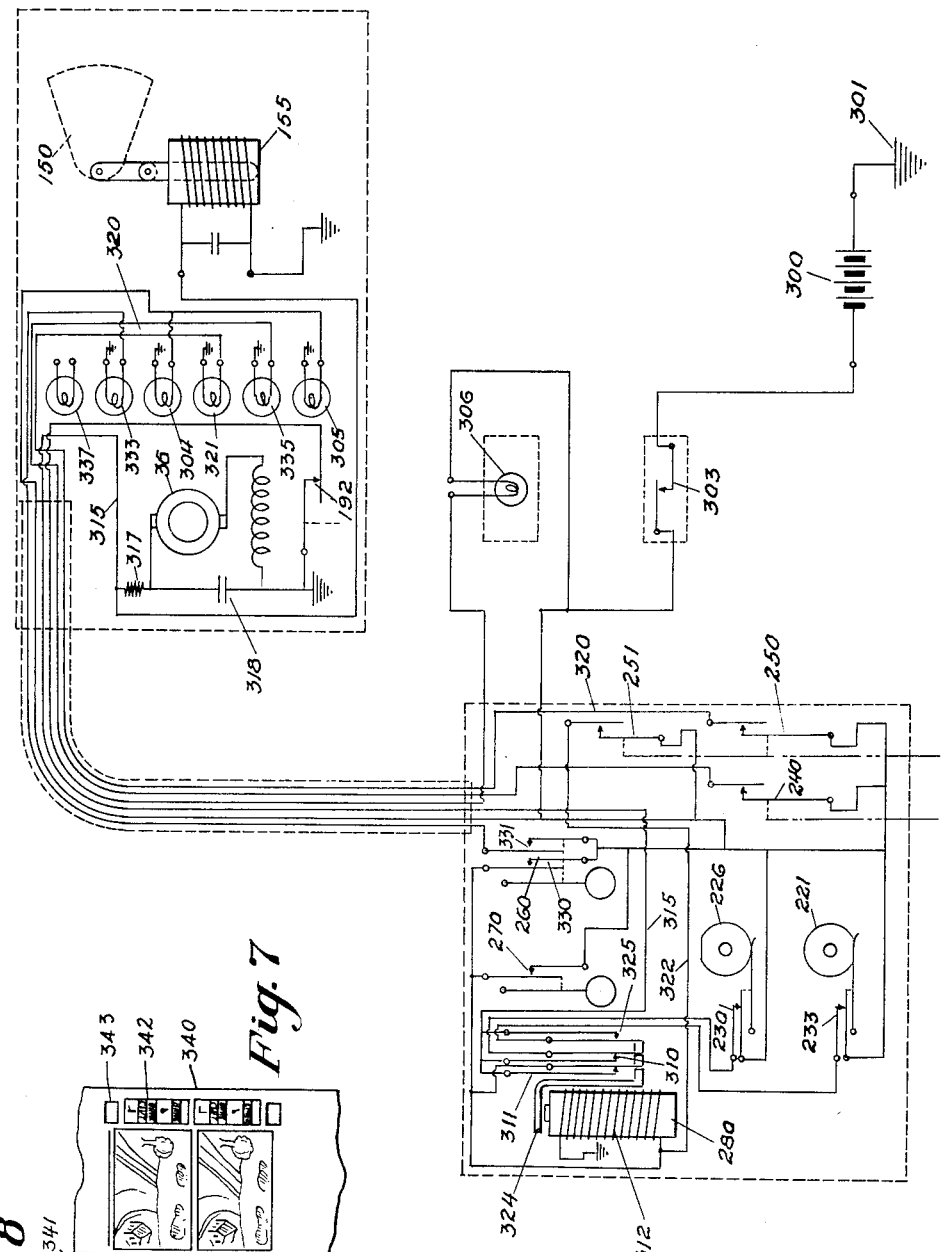
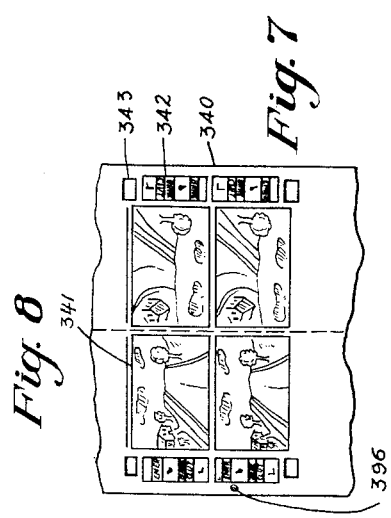

Patented Dec. 7, 1943

2,336,076

UNITED STATES PATENT OFFICE 2,336,076

RECORDING MECHANISM FOR VEHICLE OPERATION

Hobart N. Durham, Manhasset, N. Y., and George B. Finnegan, Jr., Mountain Lakes, N. J.

Application January 29, 1940, Serial No. 316,080

6 Claims. (Cl. 234—60)

The present invention relates to new and useful improvements in recording the operation of motor vehicles and more particularly to improve photographic apparatus for making an automatic record of the course and manner of operation of the vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a fragmentary side elevation, partially in section, showing a typical and illustrative embodiment of the present invention;

Fig. 2 is a diagrammatic view of the camera means used in the present invention, certain of the cover parts being omitted;

Figure 3 is a vertical sectional view of the control unit shown in Figure 1, with the electrical wiring omitted;

Figure 5 is a sectional view taken on the line 5—5 of Figure 4;

Figure 6 is a fragmentary sectional view taken on the line 6—6 of Figure 3;

Figure 7 is a schematic view showing the wiring diagram of the illustrative embodiment shown in the other figures of the drawing; and Figure 8 is an enlarged view of a picture and indicia as exposed on the film.

Figure 4:
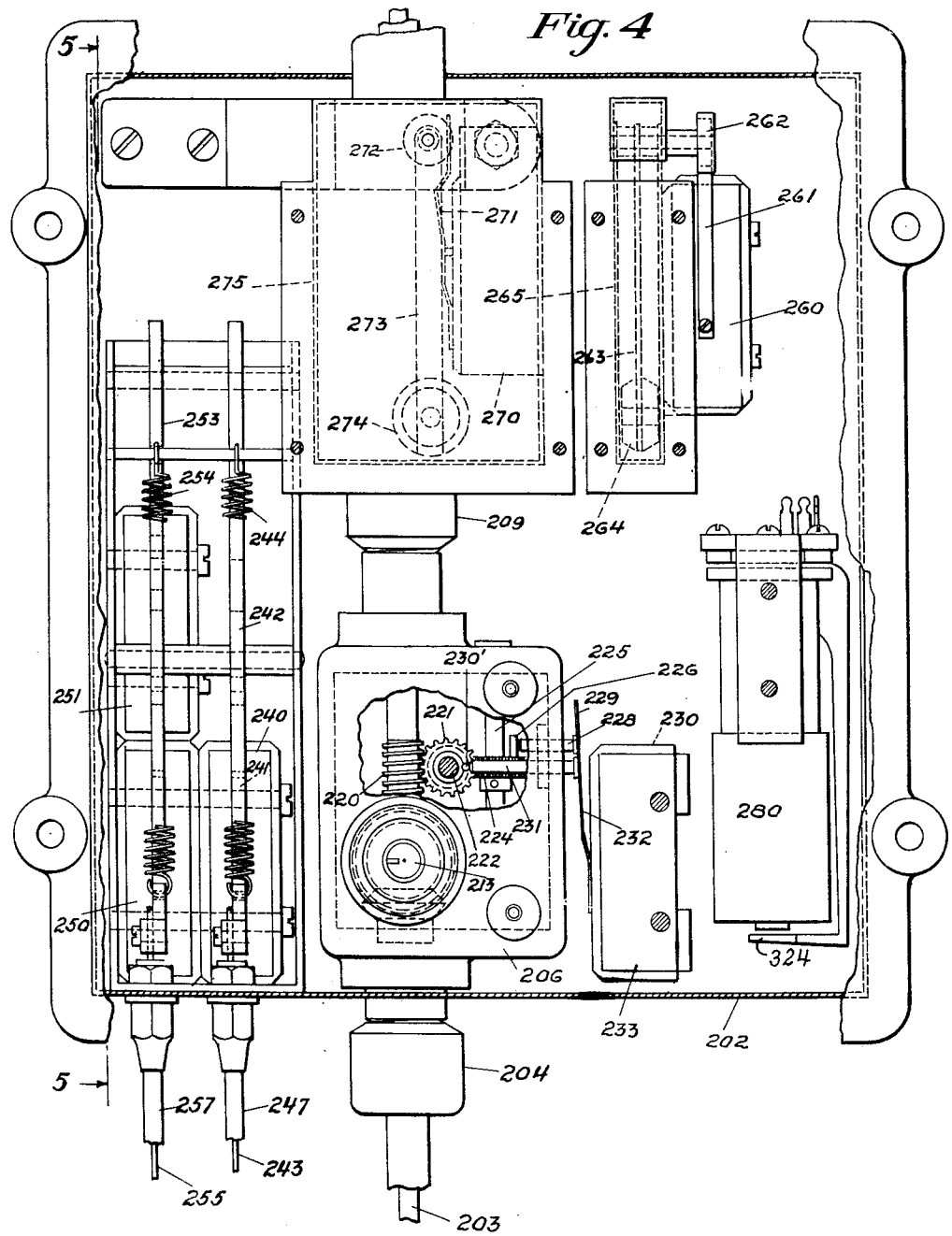
Figure 4 is a sectional view taken on the line 4—4 of Figure 3, all of the electrical connections being omitted.

The present invention has for its object the provision of a novel and improved camera control apparatus for automatically producing a continuous photographic record showing the course and manner of operation of a motor vehicle. The invention also has for its object the provision of an improved camera control apparatus which will provide a photographic record of the improper operation of a motor vehicle so that such records may be used for the correction and disciplining of their drivers as well as provide a record which will furnish pictorial evidence as to the traffic conditions at the time of an accident in which the motor vehicle is involved together with comprehensive data as to the manner in which the vehicle was operated at the time of the accident. The invention also provides an automatic recording device which will record the course, speed, time of operation and other important data concerning the operation of a motor vehicle so that the owner of the vehicle can maintain an accurate and reliable check as to its operation. Another object of the invention is the provision of an improved device for automatically recording the operation of a vehicle which can be used to provide a record over any desired period of time of another vehicle being driven ahead of the recording apparatus and is thus useful for the purpose of checking fleet operations by supervisors, providing trustworthy data which is less objectionable to the drivers than the usual unsupported word of the supervisors.

The invention further provides an automatically operated camera which produces a series of periodic photographs, at a minimum of expense, showing the continuous course of the vehicle together with detailed operating data related to each picture enabling the determination of responsibility in the case of accident as well as providing data for the improvement of the operation of the vehicle not only in the driving habits of the driver but also in routing and scheduling of the vehicles.

In accordance with the illustrative embodiment of the invention, a motor vehicle is provided with a camera operating on relatively narrow strip film, such as 16 mm. motion picture film, and provided with a lens of relatively short focal length so as to include in each picture a maximum angle of view, as well as to insure not only that all of the road and scene within the angle of view are in focus, but also to permit instruments controlled by the operation of the vehicle to be contained within the camera casing and be substantially within the depth of focus of the camera lens.

The camera is preferably mounted at a considerable distance above the road, near the front and upper portion of the vehicle and is directed forwardly of the vehicle so as to show the approaching traffic and the roadway to be travelled. Means are provided for automatically taking successive photographs and for this purpose the film is exposed and advanced normally each time the vehicle has travelled a predetermined distance, say 500 feet, but it is also exposed and advanced at more frequent intervals when the conditions require that photographs be taken more frequently to record all of the conditions of operation; thus, when the vehicle is being steered around a substantial curve, the pictures are taken as often as every 50 feet, and similar pictures are taken every 50 feet while the vehicle is being braked to slow it or bring it to a stop, and additional photographs are produced on the record film at the moment when the brake is first applied or whenever the vehicle is decelerated by braking or otherwise in excess of a predetermined rate.

Thus, the series of pictures will show the normal operation of the vehicle, the pictures taken while the vehicle is being steered will show overlapping portions of the roadway, the picture taken when the brake was initially applied will show the conditions ahead which required the application of the brake, the emergency or deceleration controlled picture will likewise show whether the excessive deceleration was caused by braking or a collision, and the series of pictures during braking will show a succession of road scenes from which it can be accurately determined whether the operator applied the brake sufficiently early to have been prudent in the case of an accident as well as to show whether the avoidance of an accident was due to his skill and judgment or was due to other causes.

Included in, and forming an integral part of each of the record pictures is a record of operating data such as vehicle speed, time, whether or not the vehicle was braked, whether the clutch was disengaged as in coasting, as well as any other desired factors which are of importance in connection with the proper operation of the vehicle.

Preferably, the camera is provided with a removable magazine which contains a substantial supply of film so that the film need not be replenished over a long period of time, such as a week's normal operation, and the magazines are preferably removable from the camera without film wastage or destruction of the previously made record thereby enabling each operator of the vehicle to have his own magazine so that he may be fairly charged with personal responsibility for the record of his own operations.

Provision is also made for protecting the camera against weather and dirt so that it may continue in operation without excessive attention over long periods of time and under all conditions of operation. The camera is preferably electrically controlled and powered, is difficult to tamper with so as to produce an inaccurate or unduly favorable record.

It will be understood that the foregoing general description, and the following detailed description as well, are exemplary and explanatory of the invention, but are not restrictive thereof.

Referring now in detail to the accompanying drawings which show a typical and illustrative embodiment of the present invention, the recording camera is shown as mounted on the upper portion of a conventional motor vehicle, and the control assembly is mounted on the dash panel of the vehicle. The motor vehicle is provided with the usual steering wheel 10, brake pedal 11, clutch pedal 12, speedometer drive shaft 13, while above the operator, and preferably on the roof 14 of the vehicle, is mounted the recording camera 15.

Fig. 2 illustrates diagrammatically one form of camera for use in the present invention, the several parts of this camera being more fully described in connection with the detail description of Fig. 7. As shown in Fig. 2, the camera comprises a lens 25 adapted to form an image on half the width of the 16 mm. motion picture film fed from spool 82, the image being taken through the front aperture of the camera 29 and including as part of the image the indicia on the indicia panel 170, the images of these indicia being reflected into the lens by the mirror 160. The camera casing 20 houses the complete camera and the film is enclosed in it by means of the casting 26 mounted on the bed plate 27. The camera is driven frame-by-frame from the motor 36.

The data as to the manner of operation of the vehicle, such as time, speed, braking, etc., is preferably recorded on the photographic film in line with the perforations and preferably just the one side of the exposure area to which the data relates. Thus, along one side edge of each picture is the narrow vertical panel extending from the bottom of the picture up to the edge of the perforation (if that frame is perforated), in which panel is contained the photographic image of the various instruments. Near the rear portion of the camera and to one side of the film magazine is a vertically extending panel of instruments 170 and other indicia, the images of which may be reflected by the mirror 160 through the lens 25 to form the focused image on the edge portion of the film to one side of the road scene image area, as at 342. The instruments preferably include a speedometer, clock, a light showing when the brake is applied, a light showing when the vehicle is decelerated too rapidly, and a light showing when the vehicle is swerved in steering too sharply.

In accordance with the present invention, the road pictures are adapted to be taken periodically at relatively infrequent intervals, say every 500 feet, or ten times per mile of vehicle travel. In addition, a picture is taken whenever various unusual conditions occur, such as when the vehicle is sharply steered, when the brake is applied, and when the deceleration of the vehicle exceeds a predetermined maximum, as in a collision. While the unusual conditions continue, as with a normal or emergency application of the brakes, additional pictures are taken at much more frequent intervals, say every 50 feet or 100 pictures per mile of vehicle travel, and the taking of these more frequent pictures continues until the turning, braking or excessive deceleration has stopped. In addition, means are preferably provided for causing the indicia panel to be properly illuminated a small fraction of a second in advance of the actual exposure so that the filaments of the lamps 305, 335, 321, 333 and 337 illuminating the indicia will be at proper intensity at the time of the exposure.

As shown in Figures 1 and 3 to 6 of the drawings, the control mechanism is preferably formed as a unit which is detachably connected to some convenient portion of the vehicle such as the front body panel 200. This control unit 202 is adapted to be connected to the conventional speedometer shaft which is driven from the transmission box in the usual way, and this shaft is shown as a flexible shaft 203, which is connected by a suitable fitting 204 to the under side of unit 202. Shaft 203 drives main shaft 205 rotatably mounted within the casing 206 by means of anti-friction bearings 207 and 208, and provided at its upper end with a suitable fitting 209 by which the main shaft 205 may drive flexible shaft 210.

Main shaft 205 is also provided with a bevel gear 211 meshing with bevel gear 212 fixed to the end of the speedometer takeoff shaft 213 journalled in anti-friction bearings 214 and which may be connected by fitting 215 to the short speedometer shaft 216 for driving the conventional speedometer 217.

For causing the normal exposures at the rate of ten per mile, main shaft 205 is provided with worm 220 meshing with worm gear 221 mounted on cross shaft 222 which also carries worm 223 meshing with worm gear 224 which is carried by the vertical shaft 225. Extending from one side of worm gear 224 is a short pin 226 adapted to engage plunger 228 momentarily once each revolution of worm gear 224, and plunger 228 is adapted to contact with switch operating arm 229 of switch 230 which closes the switch once each revolution of worm gear 224 or about ten times per mile of vehicle travel.

For the actuation of the shutter at more frequent intervals, say one hundred times per mile, or approximately every fifty feet, a pin 230' projects laterally from the side of gear 221, and is adapted to make momentary contact with the inner end of plunger 231 which cooperates with the switch arm 232 of switch 233 to close this switch momentarily.

Also enclosed within the control unit 202 are various other switches including, as illustratively embodied, the clutch operated switch 240, the brake operated switches 250 and 251, the emergency operated switch 260, and the sharp turn switch 270.

Separate switches 250 and 251 are preferably employed so that their actuation may be differently timed, and as illustrated, switch 250 is adapted to be actuated slightly before the actuation of switch 251, as the slide rod 253 is raised.

Clutch operated switch 240 is provided with switch operating arm 241 which engages with the cam surface formed on slide rod 242, and slide rod 242 is moved to switch closing position by disengagement of the clutch through push pull wire 243 normally held under tension by spring 244, one end of the push pull wire 243 being connected to the lower end of bar 242 while the other end is attached to the clutch pedal 12. Likewise, the brake operated switches 250 and 251 provided with similar switch operating arms cooperating with the cam surface of slide rod 253 are adapted to be closed as brake pedal 11 is depressed to apply the brake. Spring 254 is connected to the rod 253 and holds push pull wire 255 in tension between the lower end of slide bar 253 and the brake pedal 11. Push pull wires 243 and 255 are enclosed in their individual sheaths 247 and 257, respectively, which are anchored to the chassis by clamp 246 near the pedals 11, 12, the other end of these sheaths being fitted to the lower wall of casing 206.

For controlling the camera and indicia when the vehicle is turning, and more frequent taking of pictures may be required in order to make a complete record of the course of the vehicle and the incidents occurring therealong, another switch 270 is provided and is closed by centrifugal force developed by the turning of the vehicle in either direction. As embodied, the switch 270 is provided with a switch arm 271 normally resting against a flat on disc 272 which is rigidly connected to and moved by a freely swinging pendulum 273 adapted to swing transversely of the vehicle. Preferably, the pendulum bob 274 is variably positionable along the pendulum so as to vary the amount of centrifugal force necessary for the closing of the switch. In order to prevent fast swinging of the pendulum 273, the pendulum is preferably contained within an oil-tight housing 275 filled with some relatively viscous liquid such as lubricating oil or hydraulic brake fluid which will have the tendency of damping minor vibrational movements of the pendulum, allowing it to respond to a continuous development of centrifugal force in the same direction over a moderate period of time, say one half to two seconds.

In order to actuate the camera when the deceleration of the vehicle exceeds a predetermined maximum, as in case of a collision with a fixed object or a rough or jolting application of the brakes such as might damage the cargo or cause injury to bus passengers, another switch 260 is provided which is illustratively shown as a double pole, single throw switch to be actuated by switch arm 261, which rests against the flat on cam 262 connected to the freely swinging pendulum 263 having an adjustable bob 264, and likewise immersed in some damping liquid within the housing 265. As the vehicle is suddenly decelerated, the pendulum 263 swings forwardly of the vehicle by inertia, thereby shifting the switch arm 261 to its operative position.

Also contained within the control unit 202 is a relay 280 which is preferably of a relatively slow make and slower break type, and is adapted to close such of the branch circuits as are necessary to permit the periodically operating switches to be rendered effective, at the same time allowing the occasionally operated switch to be rendered effective. That is, this relay permits the pictures to be taken every fifty feet by closing of the switch 230 while the brake is depressed and switches 250 and 251 are also closed and have caused a picture to be taken. The action is similar with respect to the occasional taking of pictures caused by switches 260 and 270.

Control unit 202 is connected with the camera by means of a flexible shaft 210 which is connected to drive speedometer 182 through the bevelled gearing 290, and the sheath surrounding the flexible shaft 210 also serves as a protective covering for the group of conductors 291 which interconnect the control unit 202 and the camera 15.

Figure 7 of the drawings is a circuit diagram showing the illustrative manner in which the electrical connections are made between the various parts which have been described in connection with the other figures of the drawings. As embodied, the power is derived from any suitable source such as a storage battery 300 which is grounded to the chassis at 301 and is connected to the recording camera and control apparatus through a master switch 303, which leads to the movable contact of switches 230, 233, 240, 250, 251, 270, as well as both movable contacts of the switch 260. In addition, the current is supplied to the master switch 303 to the lights 304 and 305 for the speedometer and clock, respectively, in the camera casing 15, and is also supplied to one terminal of a pilot or signal light 306, located at some convenient point, such as on the dashboard of the vehicle. Whenever the master switch 303 is closed, current is supplied to lamps 304, 305, and is always available for the switches 230, 233, 240, 250, 251, 260 and 270. Pilot light 306 is normally out but is lit by the closing of switch 192 when the film supply is exhausted.

During the normal operation switch 230 is closed every one tenth of a mile, causing current to be supplied to the middle contact 310 of relay 280, from the battery 300 through switch 303 through switch 230. Contact 310 is normally closed as are the relay contacts 311, and current is supplied through 310 to 311 and thence to the coil 312 of relay 280, as well as to the motor conductor 315 supplying energy to motor 36 and to weather shutter solenoid 155, causing the motor 36 to expose a frame of film and advance the film, at the same time as the weather shutter 150 is opened. An inductive resistance 317 is in circuit with the motor, and the windings of the motor are shunted by condenser 318 so that the motor action will be delayed at all times with respect to the shutter 150 as well as with respect to the various lamps illuminating the indicia panel 170.

When the brake is applied, switch 250 is closed and current is supplied through conductor 320 to the brake indicia lamp 321, lighting the lamp so that the corresponding indicia will be registered on the film. Simultaneously, switch 251 is closed and current is supplied through conductor 322 to the coil 312 of relay 280, this connection also supplying current to contacts 311 so that current is also supplied to motor 36 and solenoid 155, again causing the motor to expose the film and feed the film, as the weather shutter 150 is opened. As the coil 312 is energized, relay armature 324 is attracted, breaking the circuit at contacts 310 and 311 after the lapse of a fraction of a second, and making the circuit at contact 325, thereby connecting switch 233 in circuit so that succeeding pictures are taken periodically by rotation of switch actuating gear 221 every one hundredth of a mile through current supplied from the battery, through switch 233, contact 325, and thence to the motor 36 and solenoid 155. During the fraction of a second required for the attraction of the relay armature 324 prior to the opening of contacts 310, 311, and the closing of contact 325, sufficient amount of time has elapsed for the lighting of the indicia lights and for a full revolution of the shutter 30 driven by the motor 36. Thus, when the brake is applied, the camera is instantly actuated, and continues to take successive pictures at an accelerated rate so long as the brake remains depressed, and this accelerated rate of taking pictures also occurs when the vehicle is turned sharply, when excessive deceleration occurs, or in general, when the vehicle deviates greatly from its normal straight course at a substantially uniform speed.

In case the vehicle is turned sharply, switch 270 is closed, supplying current to coil 312, motor 36 and solenoid 155 in the same manner as with switch 251 (not 250).

When excessive deceleration occurs, switch 260 is closed as to both its poles, and current is supplied through contacts 330 to the relay winding 312, motor 36 and solenoid 155, and current is also supplied through contact 331 to the indicia panel light 333 which illuminates indicia 172.

Disengagement of the clutch closes switch 240 which does not of itself cause the taking of any record pictures, but the closing of this switch merely causes indicia light 335 to be illuminated so that the fact that the clutch was disengaged will be recorded when the taking of a picture occurs for any other reason. Thus, a succession of pictures showing the clutch disengaged, and a fairly high or increasing speed would indicate dangerous coasting down grade.

A spare indicia light 337 is provided which may be illuminated when the gears are in neutral, when the doors of the bus are open, or when any other desired condition occurs.

Figure 8 shows a typical portion of a record film produced by the illustrated embodiment. The film 340 is shown as standard 16 mm. motion picture film, with each of the record images covering one quarter of a normal frame. The road image is designated as 341, while the series of indicia records are designated 342 and are positioned at the edges of the film and between the film feeding perforations 343. The fogged portion 196 shows that the vehicle was stopped for a considerable period of time between two of the successive exposures. The images at the left hand half of the film are in sequence, and the inverted images at the right hand side of the film represent travel of the vehicle after the magazine has been inverted.

The invention in its broader aspects is not limited to the specific mechanisms shown and described but departures may be made therefrom within the scope of the accompanying claims without departing from the principles of the invention and without sacrificing its chief advantages.

What we claim is:

1. In a motor vehicle, the combination of a plurality of vehicle controls, an electrically actuated, multiple exposure camera mounted on the vehicle to photograph the roadway to be travelled by the vehicle, indicia controlled by the operation of the vehicle under the influence of the controls and included within the field of view of the camera lens, a switch operated periodically by the travel of the vehicle for causing actuation of the camera, a normally ineffective camera actuating switch operated more frequently by the travel of the vehicle and means controlled by a deviation of the vehicle from a straight course at a substantially uniform speed of travel for rendering the second switch effective.

2. In a motor vehicle, the combination of a steering control for the vehicle, a multiple exposure camera mounted on the vehicle to photograph the roadway to be travelled by the vehicle, indicia controlled by the operation of the vehicle and included within the field of view of the camera lens, and means controlled by the operation of the vehicle in response to the steering control for taking an exposure of the roadway and indicia at the time of operation of the control and means for taking exposures periodically in succession as determined by the travel of the vehicle over the roadway.

3. In a motor vehicle, the combination of a brake controlling the operation of the vehicle, a multiple exposure camera mounted on the vehicle to photograph the roadway to be travelled by the vehicle, indicia controlled by the operation of the vehicle and included within the field of view of the camera lens, means controlled by the operation of the brake and the response of the vehicle thereto for taking an exposure of the roadway and indicia at the time of operation of the brake, means for taking exposures periodically in succession proportionally to the travel of the vehicle and means for accelerating the rate of exposures in accordance with the manner of vehicle operation.

4. In a motor vehicle, the combination of a plurality of vehicle controls, an electrically actuated, multiple exposure camera mounted on the vehicle to photograph the roadway to be travelled by the vehicle, indicia controlled by the operation of the vehicle under the influence of the controls and included within the field of view of the camera lens, a switch operated periodically by the travel of the vehicle for causing actuation of the camera, a normally ineffective camera actuating switch operated more frequently by the travel of the vehicle, means operated by one of the vehicle controls and alternatively by certain deviations of the vehicle from a normal substantially straight path for affecting actuation of the vehicle and for rendering the second switch effective.

5. In a motor vehicle, the combination of a vehicle control, an electrically actuated, multiple exposure camera mounted on the vehicle to photograph the roadway to be travelled by the vehicle, indicia controlled by the operation of the vehicle and included within the field of view of the camera lens, a switch operated periodically by the travel of the vehicle for causing actuation of the camera, a normally ineffective camera actuating switch operated more frequently by the travel of the vehicle, and means operated by the vehicle control for affecting actuation of the vehicle and for rendering the second switch effective.

6. In a motor vehicle, the combination of a vehicle control, an electrically actuated, multiple exposure camera mounted on the vehicle to photograph the roadway to be travelled by the vehicle, indicia controlled by the operation of the vehicle and included within the field of view of the camera lens, a switch operated periodically by the travel of the vehicle for causing actuation of the camera, a normally ineffective camera actuating switch operated more frequently by the travel of the vehicle, a plurality of means controlled respectively by the vehicle control and by deviation of the vehicle from a substantially straight, uniform speed path for causing instantaneous actuation of the camera and means for rendering the second switch effective.

HOBART N. DURHAM.
GEORGE B. FINNEGAN, Jr.